US012485688B2

(12) United States Patent
Kawaguchi et al.

(10) Patent No.: US 12,485,688 B2
(45) Date of Patent: Dec. 2, 2025

(54) PRINTING APPARATUS

(71) Applicant: SEIKO EPSON CORPORATION, Tokyo (JP)

(72) Inventors: Yuta Kawaguchi, Shiojiri (JP); Hideyuki Kataoka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 18/461,221

(22) Filed: Sep. 5, 2023

(65) Prior Publication Data

US 2024/0075759 A1 Mar. 7, 2024

(30) Foreign Application Priority Data

Sep. 6, 2022 (JP) ................................ 2022-141216

(51) Int. Cl.
*B41J 2/175* (2006.01)
*B41J 29/00* (2006.01)

(52) U.S. Cl.
CPC ............... *B41J 29/00* (2013.01); *B41J 2/175* (2013.01)

(58) Field of Classification Search
CPC . B41J 2/175; B41J 19/005; B41J 29/00; B41J 29/02; B41J 2002/14491
See application file for complete search history.

(56) References Cited

U.S. PATENT DOCUMENTS

| | | | | |
|---|---|---|---|---|
| 6,679,580 B2 * | 1/2004 | Meados | ............ | H04N 1/00519 347/50 |
| 2005/0117010 A1 * | 6/2005 | Ishii | ........................ | B41J 11/42 347/104 |
| 2009/0174749 A1 * | 7/2009 | Kemma | .................. | B41J 3/543 347/37 |
| 2019/0291425 A1 | 9/2019 | Torigoe | | |
| 2020/0307245 A1 * | 10/2020 | Kashiwabara | ....... | B41J 2/17509 |

FOREIGN PATENT DOCUMENTS

JP 2019-166730 A 10/2019

* cited by examiner

*Primary Examiner* — Anh T Vo
(74) *Attorney, Agent, or Firm* — WORKMAN NYDEGGER

(57) ABSTRACT

A printing apparatus includes a main body unit, a head unit that ejects ink onto a medium, a carriage that reciprocates with the head unit mounted on the main body unit, a support shaft that extends in a reciprocating direction of the carriage and supports the carriage, and a cable that has one end coupled to the main body unit and the other end electrically coupled to the head unit, and supplies an electrical signal to the head unit, the carriage includes a holder that holds the cable, and a plurality of supported portions that come into contact with the support shaft and are supported by the support shaft, and the holder is disposed at a position between at least two of the plurality of supported portions in the reciprocating direction.

9 Claims, 5 Drawing Sheets

PRINTING APPARATUS

The present application is based on, and claims priority from JP Application Serial Number 2022-141216, filed Sep. 6, 2022, the disclosure of which is hereby incorporated by reference herein in its entirety.

BACKGROUND

1. Technical Field

The present disclosure relates to a printing apparatus.

2. Related Art

In the related art, various printing apparatuses that eject ink to form images have been used. Among these, there is a printing apparatus that includes a carriage that has a head unit mounted therein and reciprocates, and a cable having one end coupled to a main body unit and the other end coupled to the head unit of the carriage in order to send an electrical signal. For example, JP-A-2019-166730 discloses a printer including a carriage that has a recording head mounted therein and reciprocates, and a cable that has one end coupled to an apparatus main body and the other end coupled to the carriage.

However, in a printing apparatus of the related art such as JP-A-2019-166730, which includes a carriage that has a head unit mounted therein and reciprocates, and a cable having one end coupled to a main body unit and the other end coupled to the carriage, force may be applied to a holder holding the cable in the carriage due to bending of the cable due to reciprocating of the carriage, and the carriage may be displaced. There is concern that the displacement of the carriage due to the reciprocating of the carriage at the time of printing will cause a deviation of an ink ejection position, resulting in deterioration of printing accuracy.

SUMMARY

A printing apparatus according to the present disclosure for solving the above problems includes a main body unit; a support shaft provided in the main body unit and extending in a predetermined direction; a carriage supported by the support shaft and configured to reciprocate in a direction in which the support shaft extends; a head unit mounted on the carriage and configured to eject ink onto a medium; and a cable configured to have one end coupled to the main body unit and the other end electrically coupled to the head unit, and supply an electrical signal to the head unit, wherein the carriage includes a holder configured to hold the cable, and a plurality of supported portions configured to be in contact with and be supported by the support shaft, and the holder is disposed at a position between at least two of the plurality of supported portions in the reciprocating direction.

DESCRIPTION OF EMBODIMENTS

Figure 1:
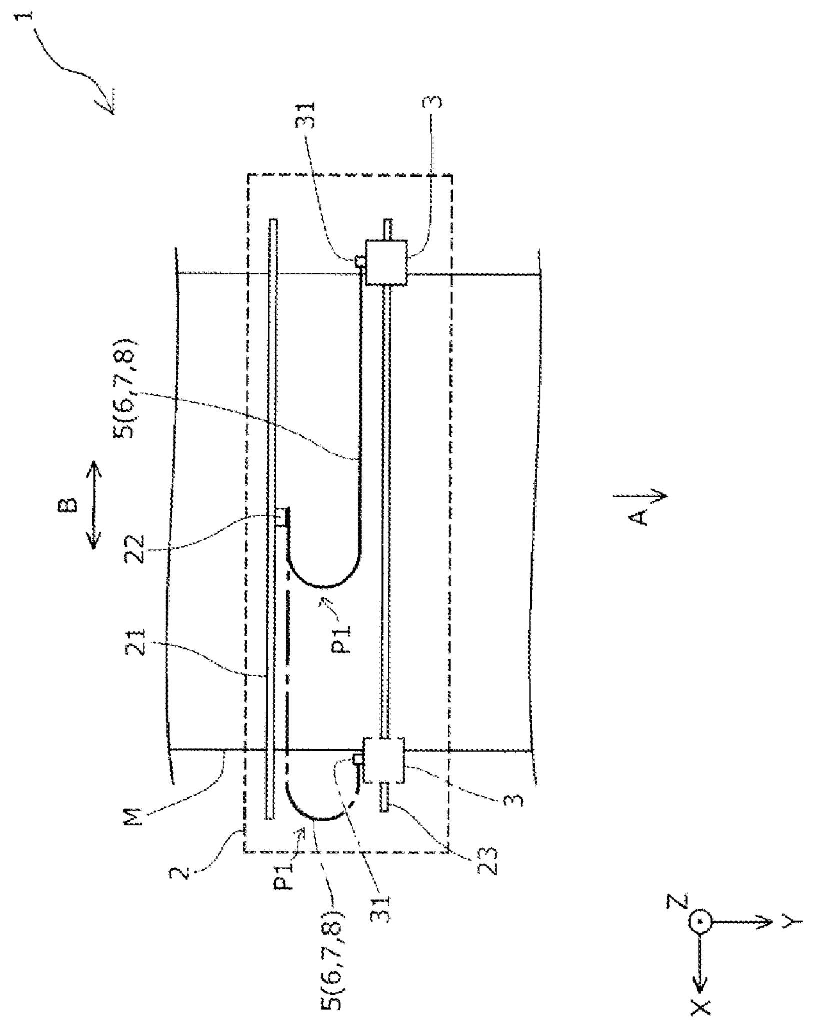
FIG. 1 is a schematic plan view of a printing apparatus according to an embodiment of the present disclosure.

First, the present disclosure will be generally described.

A printing apparatus according to a first aspect of the present disclosure for solving the above problems is characterized in that the printing apparatus includes a main body unit; a support shaft provided in the main body unit and extending in a predetermined direction; a carriage supported by the support shaft and configured to reciprocate in a direction in which the support shaft extends; a head unit mounted on the carriage and configured to eject ink onto a medium; and a cable configured to have one end coupled to the main body unit and the other end electrically coupled to the head unit, and supply an electrical signal to the head unit, wherein the carriage includes a holder configured to hold the cable, and a plurality of supported portions configured to be in contact with and be supported by the support shaft, and the holder is disposed at a position between at least two of the plurality of supported portions in the reciprocating direction.

According to the present aspect, the holder is disposed at the position between the at least two of the plurality of supported portions in the reciprocating direction. Therefore, even when force is applied to the holder due to bending of the cable due to the reciprocating of the carriage, it is possible to curb application of the force in a direction in which the holder is displaced and to curb the displacement of the carriage, thereby curbing a deviation of the ink ejection position.

A printing apparatus according to a second aspect of the present disclosure is characterized in that, in the first aspect, the printing apparatus includes a flexible reinforcing portion extending along the cable from the one end to the other end, wherein the reinforcing portion is coupled to the holder.

According to the present aspect, the printing apparatus includes a flexible reinforcing portion extending along the cable from the one end to the other end. Therefore, it is possible to reinforce the cable. Further, when the reinforcing portion is included, it is possible to curb the displacement of the carriage and to curb a deviation of the ink ejection position even when force is further applied to the holder due to bending of the reinforcing portion.

A printing apparatus according to a third aspect of the present disclosure is characterized in that, in the second aspect, the reinforcing portion is made of metal.

According to the present aspect, the reinforcing portion is made of metal. Therefore, it is possible to reinforce the cable with high accuracy.

A printing apparatus according to a fourth aspect of the present disclosure is characterized in that, in the first or second aspect, a tube configured to supply ink to the head unit, the tube being a flexible tube extending from the one end to the other end along the cable, is included.

According to the present aspect, the tube configured to supply ink to the head unit, the tube being a flexible tube extending from the one end to the other end along the cable, is included. Therefore, it is possible to suitably supply ink to the head unit.

A printing apparatus according to a fifth aspect of the present disclosure is characterized in that, in the first or second aspect, the carriage includes two supported portions, and the holder is disposed at a position including a center position between the two supported portions in the reciprocating direction.

According to the present aspect, the carriage includes two supported portions, and the holder is disposed at a position including a center position between the two supported portions in the reciprocating direction. With such a configuration, even when force is applied to the holder due to bending of the cable due to reciprocating of the carriage, it is possible to particularly curb application of the force in the direction in which the holder is displaced and to effectively curb the displacement of the carriage, thereby particularly curbing the deviation of the ink ejection position.

A printing apparatus according to a sixth aspect of the present disclosure is characterized in that, in the first or second aspect, the holder is disposed at a position including a centroid position of the carriage in the reciprocating direction.

According to the present aspect, the holder is disposed at a position including a centroid of the carriage in the reciprocating direction. With such a configuration, even when force is applied to the holder due to bending of the cable due to reciprocating of the carriage, it is possible to particularly curb application of the force in the direction in which the holder is displaced and to effectively curb the displacement of the carriage, thereby particularly curbing the deviation of the ink ejection position.

A printing apparatus according to a seventh aspect of the present disclosure is characterized in that, in the first or second aspect, the carriage includes the holder on the rear side of the support shaft in a front-rear direction intersecting with the reciprocating direction and an ejection direction of the ink.

According to the present aspect, the carriage includes the holder on the rear side of the support shaft in the front-rear direction. With such a configuration, it is possible to simplify the configuration of the carriage.

A printing apparatus according to an eighth aspect of the present disclosure is characterized in that, in the seventh aspect, the carriage mounts the head unit on the forward side from the support shaft in the front-rear direction.

According to the present aspect, the carriage mounts the head unit on the forward side from the support shaft in the front-rear direction. With such a configuration, it is possible for the user to easily access the head unit, for example, at the time of maintenance of the head unit.

A printing apparatus according to a ninth aspect of the present disclosure is characterized in that, in the first or second aspect, the cable is rotatably coupled to the carriage in a rotation direction with a front-rear direction intersecting the reciprocating direction and an ejection direction of the ink as a rotation axis direction.

According to the present aspect, the cable is rotatably coupled to the carriage in the rotation direction with a front-rear direction as the rotation axis direction. With such a configuration, it is possible to curb the displacement of the carriage to curb the deviation of the ink ejection position while curbing the application of large force to the cable due to the reciprocating of the carriage.

Hereinafter, embodiments of the present disclosure will be specifically described with reference to the drawings. First, an overview of a printing apparatus 1 according to an embodiment of the disclosure will be described. In FIGS. 1 to 5, some constituent members are omitted in order to make the configuration easier to understand. Here, an X-axis direction in the drawing is a horizontal direction corresponding to the reciprocating direction B of a carriage 3, a Y-axis direction is a horizontal direction, is a front-rear direction of the printing apparatus 1, and is a direction orthogonal to the X-axis direction, and a Z-axis direction is a vertical direction. Further, hereinafter, it is assumed that an arrow direction is a + direction, and a direction opposite to the arrow direction is a − direction. For example, it is assumed that a vertically upward direction is a +Z-direction, a vertically downward direction is a −Z-direction, a forward direction of the printing apparatus 1 is a +Y-direction, and a backward direction of the printing apparatus 1 is a −Y-direction.

The printing apparatus 1 of the present embodiment includes a main body unit 2, and the main body unit 2 is provided with a transport unit (not illustrated) that transports a medium M in a transport direction A, and a frame 21 that extends in the X-axis direction as illustrated in FIG. 1. Further, the main body unit 2 is also provided with a support shaft 23 that supports the carriage 3 extending in the X-axis direction as illustrated in FIG. 1. The carriage 3 includes a head unit 4 that ejects ink to the medium M as illustrated in FIG. 3 or the like, and reciprocates in a reciprocating direction B that is along the X-axis direction in the main body unit 2.

Figure 3:
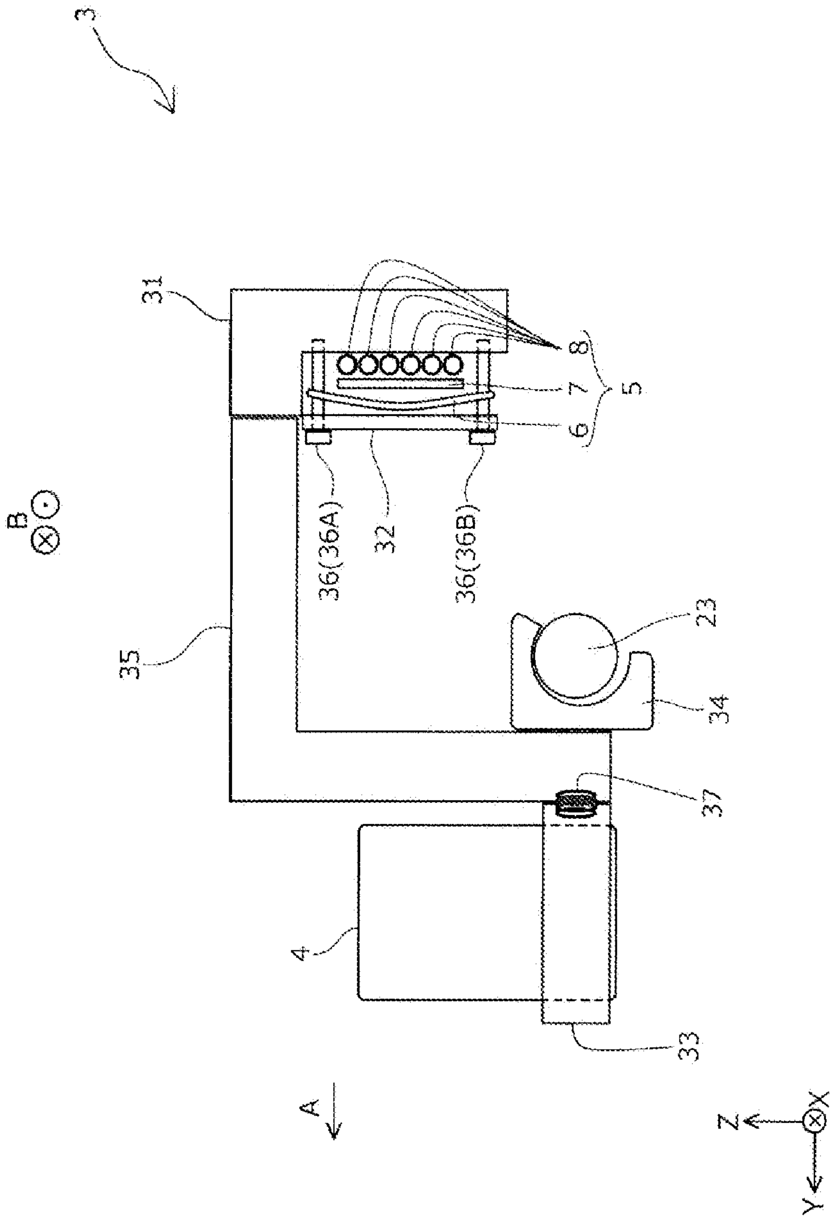
FIG. 3 is a side cross-sectional view illustrating the vicinity of the carriage of the printing apparatus in FIG. 1.

The carriage 3 is provided with a holder 31 illustrated in FIG. 3 and the like. A cable 7 that supplies an electrical signal to the head unit 4, a tube 8 that supplies ink to the head unit 4, and a thin SUS plate as a reinforcing portion 6 that reinforces the cable 7 and the tube 8 are attached to the holder 31. As illustrated in FIG. 3, the cable 7, the tube 8, and the reinforcing portion 6 form an extension portion 5 that coupless the main body unit 2 to the carriage 3. The cable 7 and the tube 8 are held in the holder 31. As illustrated in FIG. 1, the reinforcing portion 6 forming the extension portion 5 has one end coupled to a fixing portion 22 provided in the frame 21 of the main body unit 2, and the other end coupled to the holder 31 provided in the carriage 3.

An ink cartridge (not illustrated) is mounted on the main body unit 2, and ink is supplied from the ink cartridge to the head unit 4 mounted on the carriage 3 through the tube 8. Further, the main body unit 2 also includes a control unit (not illustrated) including a CPU, a storage unit such as a ROM and a memory, and the like. The head unit 4 is electrically coupled to the control unit via the cable 7. In the printing apparatus 1 of the present embodiment, the control unit controls the transport of the medium M, the reciprocating of the carriage 3, and the ejection of ink from the head unit 4.

With the configuration described above, the printing apparatus 1 of the present embodiment can eject ink from the head unit 4 onto the medium M to be transported, to from an image, while causing the head unit 4 to reciprocate in the reciprocating direction B together with the carriage 3. The printing apparatus 1 of the present embodiment can form a desired image on the medium M by repeating transporting the medium M in the transport direction A according to a predetermined transport amount, and ejecting the ink from the head unit 4 while moving the carriage 3 in the reciprocating direction B in a state in which the medium M is stopped.

In FIG. 1, a state in which the carriage 3 and the extension portion 5 are displaced between positions of the carriage 3 and the extension portion 5 indicated by a solid line and positions of the carriage 3 and the extension portion 5 indicated by an alternate long and short dash line, and an image is formed on the medium M to be transported is illustrated. At the positions of the carriage 3 and the extension portion 5 indicated by the solid line, a position P1 at which the extension portion 5 is curved is far from the carriage 3, and at the positions of the carriage 3 and the extension portion 5 indicated by the alternate long and short dash line, the position P1 at which the extension portion 5 is curved is close to the carriage 3.

Here, when the position P1 at which the extension portion 5 is curved is closer to the carriage 3, stronger force trying to return from a bent state in the extension portion 5 is applied to the carriage 3. When the stronger force trying to return from a bent state in the extension portion 5 is applied to the carriage 3, it becomes easy for rotation force with the Z-axis direction as a rotation axis to be applied to the carriage 3. When the rotation force with the Z-axis direction as a rotation axis is applied to the carriage 3, the rotation force is also applied to the head unit 4 mounted on the carriage 3, and thus, the head unit 4 is rotated and displaced from an appropriate position, and it is easy for an ink ejection position to deviate from a desired position. That is, it is easy for the ink ejection position to particularly deviate from the desired position at the positions of the carriage 3 and the extension portion 5 indicated by the alternate long and short dash line in FIG. 1. Therefore, the printing apparatus 1 of the present embodiment is configured to curb application of the rotation force to the carriage 3 and curb the deviation of the ink ejection position from the desired position. Hereinafter, this configuration will be described in detail.

Figure 2:
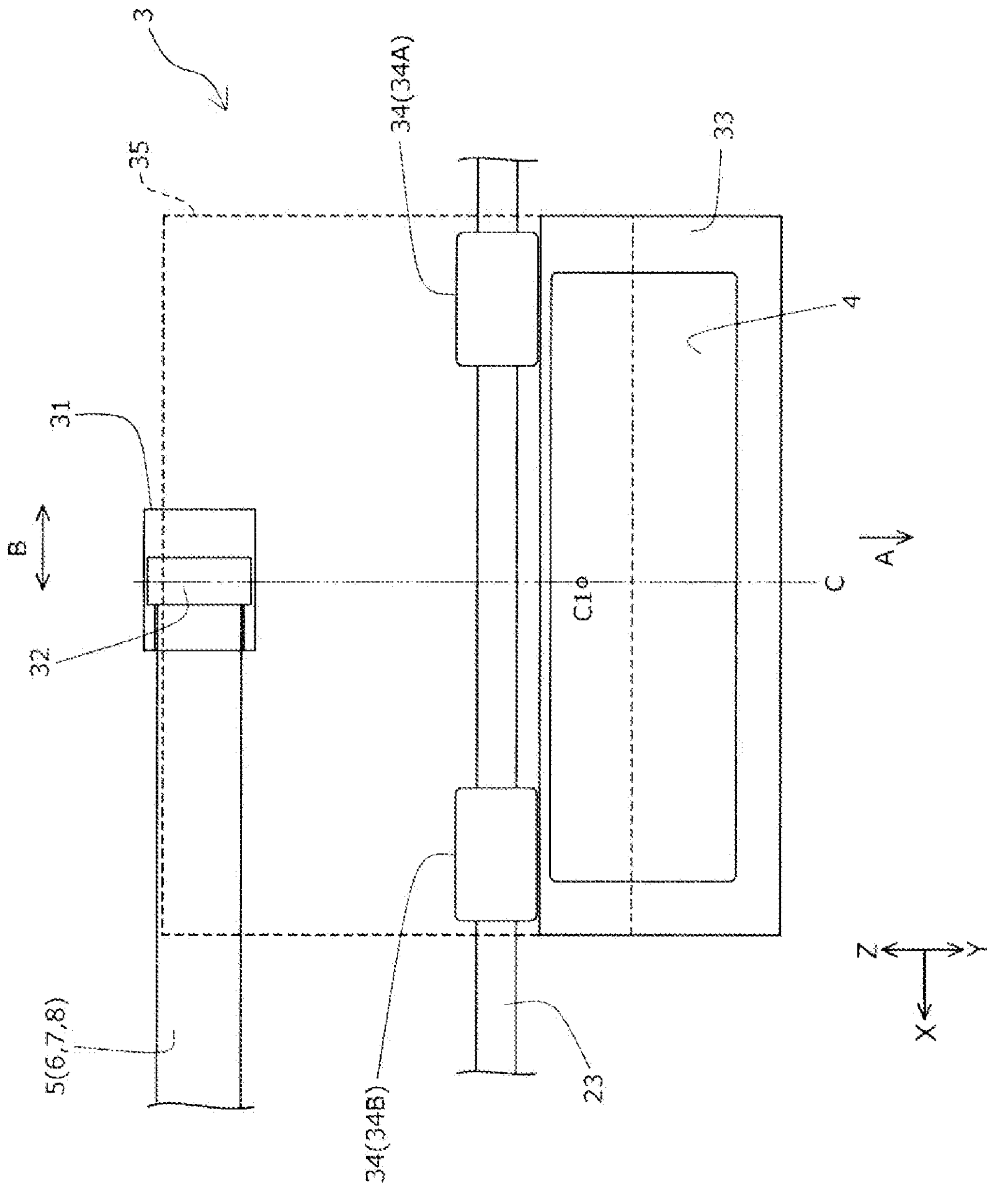
FIG. 2 is a schematic perspective view of the vicinity of a carriage of the printing apparatus of FIG. 1 when viewed from above and the front.

As illustrated in FIG. 2, the carriage 3 includes a plurality of supported portions 34 that are in contact with and are supported by the support shaft 23, in addition to the holder 31 that holds the extension portion 5 such as the cable 7. In FIG. 2, a base portion 35, which is one of the constituent members of the carriage 3, is indicated by a dashed line in order to make a structure easier to see. The holder 31 is disposed at a position between two of the plurality of supported portions 34 in the reciprocating direction B, that is, between a supported portion 34A and a supported portion 34B. Thus, the holder 31 is disposed at the position between at least two of the plurality of supported portions 34 in the reciprocating direction B, making it possible to curb application of the force in a direction in which the holder 31 is displaced, even when force is applied to the holder 31 due to bending of the extension portion 5 such as the cable 7 with the reciprocating of the carriage 3. It is possible to curb the displacement of the carriage 3 and curb the deviation of the ink ejection position.

Here, although the cable 7 is illustrated in FIG. 3, a cross-sectional view of the cable 7 is shown since FIG. 3 is a cross-sectional view. However, in practice, the cable 7 extends further from the cross-sectional portion of FIG. 3 and is coupled to the head unit 4 through the base portion 35 of the carriage 3. Further, although the cable 7 of the present embodiment is a flexible flat cable (FFC), a cable other than FFC may be used as the cable 7.

Figure 5:
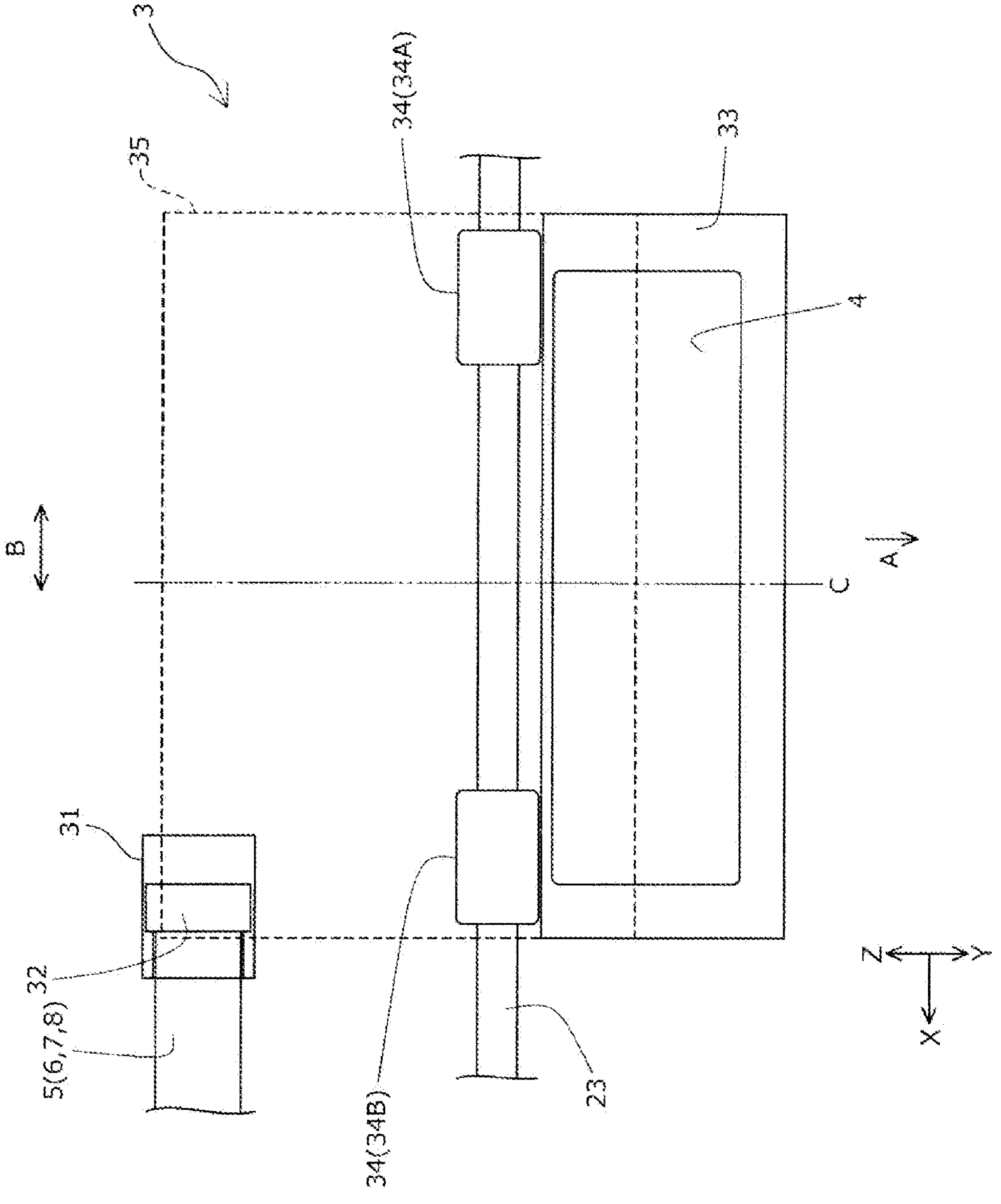
FIG. 5 is a schematic perspective view of the vicinity of a carriage of a printing apparatus according to a reference example when viewed from above and the front.

In a carriage 3 in a printing apparatus of a reference example illustrated in FIG. 5 corresponding to FIG. 2 of the printing apparatus 1 of the present embodiment, a holder 31 is disposed at a position including the outer side (+X-direction) from the supported portion 34B, which is one of the two supported portions 34 in the reciprocating direction B, rather than at the position between the two supported portions 34 in the reciprocating direction B. In such a disposition of the holder 31, when force is applied to the holder 31 due to bending of the extension portion 5 such as the cable 7 caused by the reciprocating of the carriage 3, it is easy for the entire carriage 3 to rotate with the Z-axis direction as a rotation axis. That is, in the carriage 3 in the printing apparatus of the reference example illustrated in FIG. 5, for example, when the carriage 3 is located at the position indicated by the alternate long and short dash line in FIG. 1, it is easy for the ink ejection position to deviate.

Further, the printing apparatus 1 of the present embodiment includes the flexible reinforcing portion 6 that extends along the cable 7 from one end to the other end, as described above. At least the reinforcing portion 6 among the members forming the extension portion is coupled to the holder 31. Therefore, in the printing apparatus 1 of the present embodiment, the cable 7 can be reinforced. The reinforcing portion 6 is included, and force with the Z-axis direction as the rotation axis is further applied to the holder 31 even when the reinforcing portion 6 is bent, but the holder 31 is disposed at the position between at least two of the plurality of supported portions 34 in the reciprocating direction B, making it possible to curb the displacement of the carriage 3 and curb the deviation of an ink ejection position.

Here, in the printing apparatus 1 of the present embodiment, the reinforcing portion 6 is made of SUS. The reinforcing portion 6 is made of metal such as SUS, making it possible to reinforce the cable 7 with high precision. However, a material of the reinforcing portion 6 is not particularly limited. For example, it is also possible to use a flexible resin plate.

Further, as illustrated in FIG. 3, in the printing apparatus 1 of the present embodiment, the reinforcing portion 6 has an arcuate structure with a cross section curved when viewed from the side. With such a configuration of the reinforcing portion 6, it is possible to reinforce the cable 7 with particularly high precision. Further, when the holder 31 or the base portion 35 constituting the carriage 3 as illustrated in FIG. 3 is formed of a flat component, it is easy for the carriage 3 to be bent by external force, and thus, the reinforcing portion 6 can have such an arc structure to reinforce not only the cable 7 but also the carriage 3.

Further, as described above, the printing apparatus 1 of the present embodiment includes the tube 8 that supplies ink to the head unit 4, which is the flexible tube 8 extending along the cable 7 from one end to the other end. Therefore, the printing apparatus 1 of the present embodiment can suitably supply ink to the head unit 4. Such a tube 8 is included, and force is applied to the holder 31 even when the tube 8 is bent, but the holder 31 is disposed at the position between at least two of the plurality of supported portions 34 in the reciprocating direction B, making it possible to curb the displacement of the carriage 3 and curb the deviation of an ink ejection position.

Here, although the tube 8 is illustrated in FIG. 3, a cross-sectional view of the tube 8 is shown since FIG. 3 is a cross-sectional view. However, in practice, the tube 8 extends further from the cross-sectional portion of FIG. 3 and is coupled to the head unit 4 through the base portion 35 of the carriage 3.

Further, as illustrated in FIG. 2, in the printing apparatus 1 of the present embodiment, the carriage 3 includes the two supported portions 34A and 34B as the supported portions 34, and the holder 31 is disposed at a position including a center position C between the two supported portions 34 in the reciprocating direction B. With such a configuration, even when force is applied to the holder 31 due to bending of the extension portion 5 such as the cable 7 with the reciprocating of the carriage 3, it is possible to particularly curb application of the force in the direction in which the holder 31 is displaced, and to effectively curb the displacement of the carriage 3, thereby particularly curbing the deviation of the ink ejection position. The holder 31 being "disposed at the position including the center position C between the two supported portions 34" means that at least some of the constituent members constituting the holder 31 may include the center position between the two supported portions 34.

Further, when the above is described from another point of view, the holder 31 in the printing apparatus 1 of the present embodiment is disposed at a position including a centroid position C1 of the carriage 3 in the reciprocating direction B. With such a configuration, even when force is applied to the holder 31 due to bending of the extension portion 5 such as the cable 7 with the reciprocating of the carriage 3, it is possible to particularly curb application of the force in the direction in which the holder 31 is displaced, and to effectively curb the displacement of the carriage 3, thereby particularly curbing the deviation of the ink ejection position.

Further, in the printing apparatus 1 of the present embodiment, the carriage 3 includes the holder 31 on the −Y-direction side, which is the rear side of the support shaft 23 in the front-rear direction that is along the Y-axis direction intersecting with the reciprocating direction B and the −Z-direction, which is the ink ejection direction, as illustrated in FIGS. 2 and 3. With such a configuration, it is possible to simplify a configuration of the carriage 3.

More specifically, in the printing apparatus 1 of the present embodiment, the carriage 3 includes the head unit 4 in the +Y-direction that is on the forward side from the support shaft 23 in the front-rear direction, as illustrated in FIGS. 2 and 3. With such a configuration, it is possible for the user to easily access the head unit 4, for example, at the time of maintenance of the head unit 4.

Further, in the printing apparatus 1 of the present embodiment, the carriage 3 includes the holder 31, a cover portion 32 for fixing the extension portion 5 such as the cable 7 to the holder 31, the base portion 35 to which the holder 31 is attached, two supported portions 34 attached to the base portion 35, and a mounting portion 33 coupled to the base portion 35 by a spring 37 and having the head unit 4 mounted therein, as illustrated in FIG. 3 or the like. However, the present disclosure is not limited to such a configuration. Some of these constituent members may be integrally constructed, or another constituent member may be included.

Figure 4:
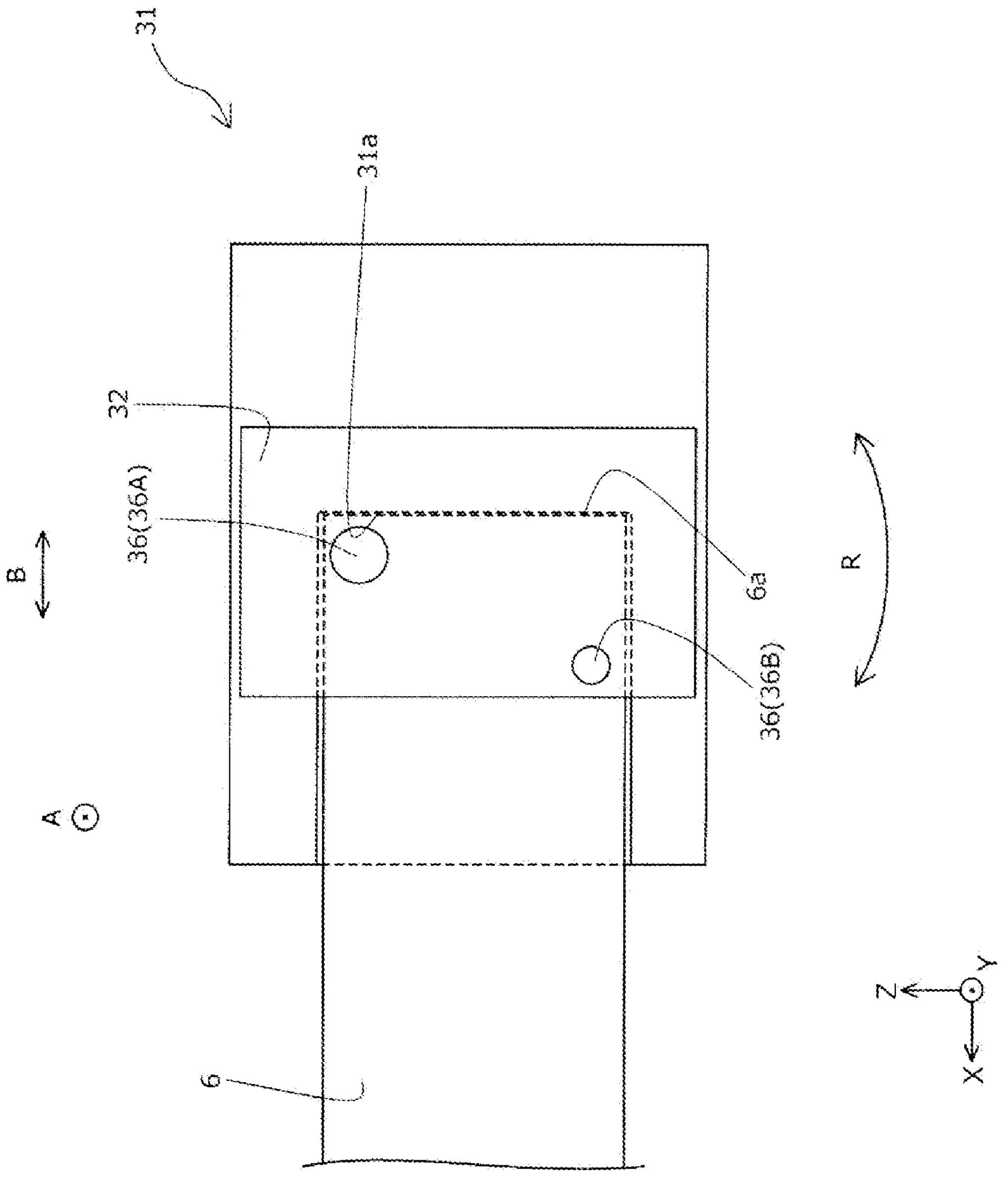
FIG. 4 is a front view illustrating the vicinity of a holder of the carriage of the printing apparatus in FIG. 1.

As illustrated in FIGS. 3 and 4, in the printing apparatus 1 of the present embodiment, the cover portion 32 is configured to be able to be attached to the holder 31 with two screws 36. Hereinafter, the holder 31 and the cover portion 32 will be described in more detail.

As illustrated in FIG. 4, the cover portion 32 is attached to the holder 31 with two screws 36 including screws 36A and 36B. The screw 36A is attached at a portion in the +Z-direction at a center portion in the X-axis direction of the cover portion 32. On the other hand, the screw 36B is attached at a portion in the −Z-direction at a portion in the +X-direction of the cover portion 32. Here, screw holes of the screw 36B provided in the reinforcing portion 6 and the cover portion 32 are configured to be one size larger than a screw shaft of the screw 36B. Therefore, the reinforcing portion 6 and the cover portion 32 can be displaced in a rotation direction R with reference to the screw 36A, with respect to the holder 31.

In other words, in the holder 31, the extension portion 5 such as the cable 7 is coupled to the carriage 3 so that the extension portion 5 can rotate in a rotation direction with the front-rear direction corresponding to the Y-axis direction intersecting with the reciprocating direction B and the −Z-direction, which is the ink ejection direction, as a rotation axis direction. With such a configuration, it is possible to curb the displacement of the carriage 3 and curb the deviation of the ink ejection position while curbing application of large force to the extension portion 5 such as the cable 7 with the reciprocating of the carriage 3.

As illustrated in FIG. 4, in the holder 31, an abutted portion 31*a* against which a tip 6*a* of the reinforcing portion 6 can be abutted is provided in a region covered by the cover portion 32. When the reinforcing portion 6 is abutted against the abutted portion 31*a*, a position in the X-axis direction of the entire extension portion 5 with respect to the holder 31 is determined. Further, the entire extension portion 5 is pressed against the holder 31 in the Y-axis direction by the cover portion 32, so that a position in the Y-axis direction of the entire extension portion 5 with respect to the holder 31 is determined.

The present disclosure is not limited to the above-described embodiments, and can be realized in various configurations without departing from the spirit of the present disclosure. Further, technical characteristics in the embodiments corresponding to technical characteristics in the respective aspects described in Summary can be substituted or combined appropriately in order to solve some or all of the above-described problems or to achieve some or all of the above-described effects. Further, when the technical characteristics are not described as being essential in the present specification, the technical characteristics can be deleted appropriately.

What is claimed is:

1. A printing apparatus comprising:

a main body unit;

a support shaft provided in the main body unit and extending in a predetermined direction;

a carriage supported by the support shaft and configured to reciprocate in a direction in which the support shaft extends;

a head unit mounted on the carriage and configured to eject ink onto a medium; and a cable having one end coupled to the main body unit and the other end electrically coupled to the head unit, and configured to supply an electrical signal to the head unit, wherein the carriage includes a holder configured to hold the cable, a base portion to which the holders is coupled, and a plurality of supported portions mounted to the base portion of the carriage and configured to be in contact with and be supported by the support shaft, and the holder is disposed at a position between at least two of the plurality of supported portions in the reciprocating direction.

2. The printing apparatus according to claim 1, comprising:

a flexible reinforcing portion extending along the cable from the one end to the other end, wherein the reinforcing portion is coupled to the holder.

3. The printing apparatus according to claim 2, wherein the reinforcing portion is made of metal.

4. The printing apparatus according to claim 1, comprising: a tube configured to supply ink to the head unit, the tube being a flexible tube extending from the one end to the other end along the cable.

5. The printing apparatus according to claim 1, wherein the carriage includes two supported portions, and the holder is disposed at a position including a center position between the two supported portions in the reciprocating direction.

6. The printing apparatus according to claim 1, wherein the holder is disposed at a position including a centroid position of the carriage in the reciprocating direction.

7. The printing apparatus according to claim 1, wherein the carriage includes the holder on a rear side of the support shaft in a front-rear direction intersecting with the reciprocating direction and an ejection direction of the ink.

8. The printing apparatus according to claim 7, wherein the carriage mounts the head unit on the forward side from the support shaft in the front-rear direction.

9. The printing apparatus according to claim 1, wherein the cable is rotatably coupled to the carriage in a rotation direction with a front-rear direction intersecting the reciprocating direction and an ejection direction of the ink as a rotation axis direction.

* * * * *